UNITED STATES PATENT OFFICE.

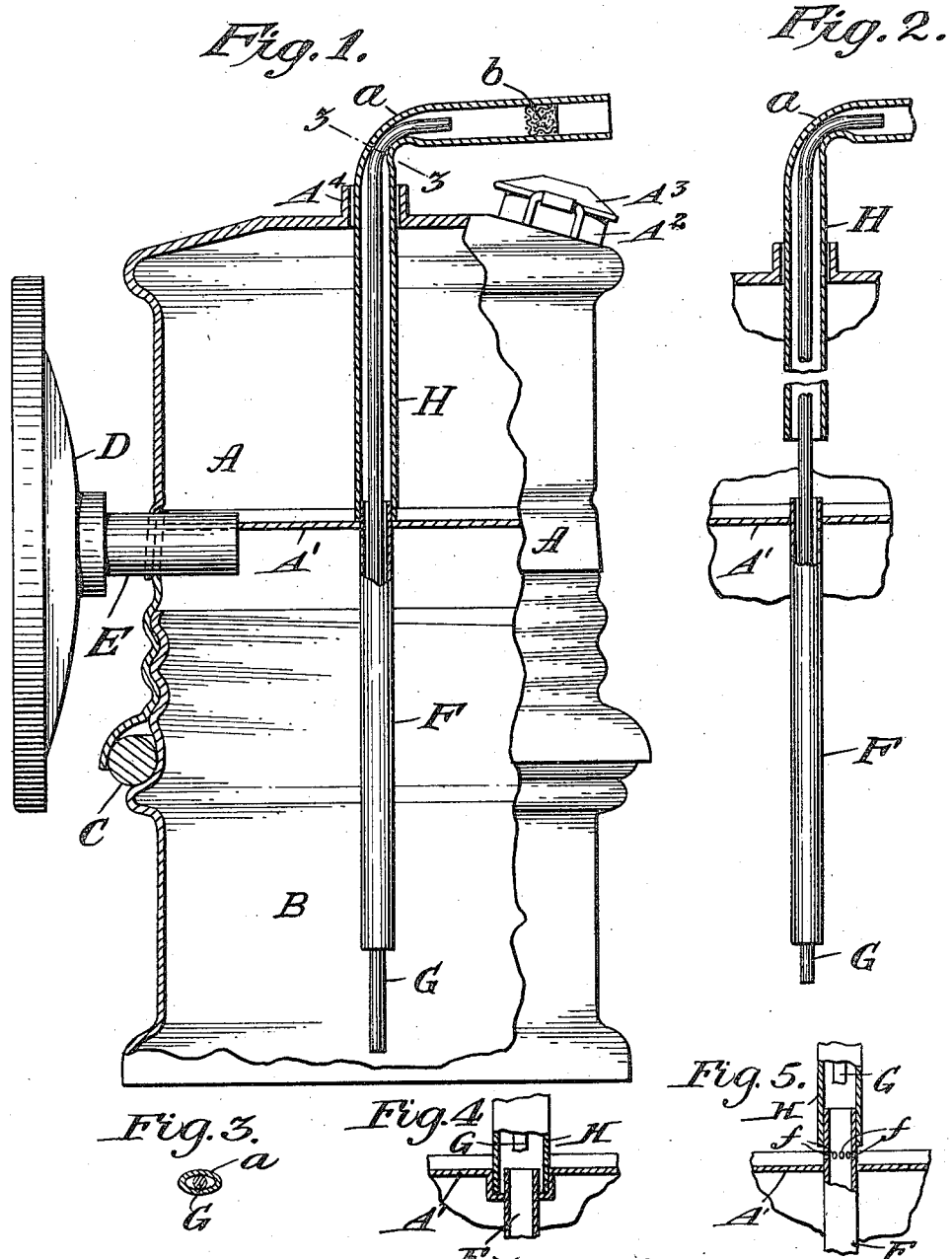

FREDERIC E. BALDWIN, OF NEW YORK, N. Y.

MINER'S LAMP.

1,237,449.   Specification of Letters Patent.   Patented Aug. 21, 1917.

Application filed May 20, 1913. Serial No. 768,775.

*To all whom it may concern:*

Be it known that I, FREDERIC E. BALDWIN, a citizen of the United States, and a resident of Richmond borough, New York city, and State of New York, have invented certain new and useful Improvements in Miners' Lamps, of which the following is a specification.

My invention relates to that class of lamp in which water or other liquid is held in one part of the lamp body, and calcium carbid or other substance from which acetylene or other gas is to be generated by contact with said liquid is held in another part of the lamp body.

The principal object of the invention is to provide a simple and efficient means for controlling the supply of liquid, such as water, to the reacting material, such as calcium carbid, while at the same time providing means for agitating the carbid or other reacting material.

The further object of the complete embodiment of the invention is to provide for the relief of any excess gas pressure.

With these general objects in view, the invention consists in the features, details of construction and combination of parts which will be described and pointed out hereinafter:

In the drawings,—Figure 1 is a side elevation, partly broken away, of a miner's lamp embodying one form of the invention and showing the liquid controlling means in its closed position. Fig. 2 is a detail sectional view, partly in elevation, of the same embodiment of the invention showing the liquid controlling means in its open position. Fig. 3 is a detail, sectional view on the line 3—3, Fig. 1. Figs. 4 and 5 are detail views illustrating modifications of the invention.

Referring to the drawings and particularly to Fig. 1, which illustrates the invention embodied in a miner's acetylene lamp, A indicates the upper part of the lamp and B the lower part, the two being shown as connected by suitable screw threads and arranged to receive a gasket C of suitable elastic material, such as rubber, whereby the two parts are connected gas-tight. The upper part of the lamp is provided with a partition A', so that the portion above said partition may serve as a water-chamber. The lower part B serves to contain the calcium carbid. The upper part of the lamp is provided with a burner tube E, on which is mounted a reflector D. To the partition A' and depending therefrom is secured a water supply pipe F, whereby water from the water-chamber above the partition A' may be supplied to the carbid in the lower part B. In order to restrict the cross-sectional area of the interior of the tube F and thereby limit the feed of water to the calcium carbid, it is usual to provide a rod as indicated at G, this rod extending below the bottom of the tube F and being arranged to be moved either longitudinally or rotatably, or both, for the purpose of agitating the sludge or residue in the vicinity of the bottom of the tube F and at the same time of clearing said tube F of any obstructing material which might otherwise accumulate therein. On the top of the upper part of the lamp is a tubulature $A^2$, provided with a hinged cap $A^3$, the latter generally having a central hole for the inlet of air.

The construction thus far described is old and in general use.

The present invention comprises means for controlling the supply of liquid from the water-chamber to the tube F, while at the same time providing means for suitably mounting the poking-rod G. This means comprises a tubular valve device, the interior of which is always in communication with the outer air. In the embodiment of the invention illustrated in Figs. 1 and 2, the valve device consists of a valve tube H, whose lower end makes a telescopic connection with the upper end of the water supply tube F, the latter tube projecting slightly above the diaphragm or partition A' for this purpose. The tube H projects through the top of the lamp, which is advantageously provided with a tubulature $A^4$, in order to give a good sliding bearing in which the tube H may move longitudinally. The poking-rod G, in the best embodiment of the invention, is extended upward through the tube H to a point outside of the lamp and is there bent at an angle. The tube H is similarly bent over and at the bend $a$ is pinched or flattened in such a way as to clamp tightly the poking-rod G. In the device embodying all the features of the invention as shown in Fig. 1, the pinching or flattening of the tube H is done in such a manner as to change the internal cross-section of the tube H from a circular to an elliptical form, the minor axis of this ellipse being the same as the external diameter of the circular poking-rod G, as clearly shown in Fig. 3, so that while the rod G is tightly held by the tube H, spaces for the passage of gas are left at each side of the rod G. The end of the tube H projecting beyond the bend is provided with a suitable resistance device which, when the valve tube is opened, will offer sufficient resistance to the escape of gas at the normal pressure to prevent the gas from escaping by way of the tube. At the same time, under excessive pressures, this resistance device will permit the escape of gas at a sufficient rate to prevent explosion of the lamp. In the particular embodiment shown, this result is accomplished in a simple manner by placing a piece of porous material, as for example felt, in the end of the pipe H, as indicated at $b$. This porous material is of such a nature as to permit the slow escape of gas at a light pressure while offering considerable resistance to the passage of such gas. On the other hand, if the pressure of gas becomes too high, the plug of porous material will be blown from the mouth of the tube H and the gas allowed to escape freely.

In the operation of the device thus far described, it will be noted that when the tube H is pushed inward, its lower end will telescope over the upper end of the tube F and thereby shut off access of the water in the water-chamber to the open upper end of said tube F. Without the presence of the rod G it would be difficult to obtain the telescoping action since there would be no means for guiding the lower end of the tube H. The rod G facilitates this action as it guides the lower end of the tube H toward the upper end of the tube F. In order to allow water to feed to the carbid, it is only necessary to draw the tube H upward until its lower end is freed from the tube F, whereupon the water in the water-chamber may overflow the upper end of said tube F and pass down to the carbid-chamber around the rod G. This condition of the parts is illustrated in Fig. 2. Tube H will be retained in its elevated position by its friction in the tubulature $A^4$.

It will be seen that the end of the tube H outside the lamp serves as a convenient handle or crank for moving the tube H into position for closing or opening the water supply and for moving the poking-rod G up and down or rotating it to agitate the carbid or sludge, and to free the tube F of any obstructions, such as particles of carbid or lime which otherwise might accumulate therein.

In the embodiment of the invention having the interior of the tube H in communication with the outer air, in case of a sudden accidental generation of gas in the carbid-chamber when the parts are in the position to shut off the water-supply to the carbid, the excess gas may escape through the tube F around the rod G, thence through the tube H to the outer air. If the pressure is only slightly above the normal amount determined by the length of water column in the tube F, the gas will escape through the pores of the plug $b$; but if the pressure is too great to be relieved in that way, the plug $b$ will be blown out and the gas will have a free exit. By this arrangement, all danger of explosion of the lamp in this condition of the parts is avoided.

If, when the parts are in the position for feeding water to the carbid, there should be a sudden generation of gas in the carbid-chamber, this gas would tend to escape up the tube F and through the tube H. If the gas had an unrestricted escape at the upper end of said tube H, it would tend to entrain the water in the water-chamber and carry it out of the water-chamber through said tube H. Owing, however, to the presence of the resistance device $b$, the gas cannot pass freely to the outer air through the tube H and consequently escapes principally from the open end of the tube F into the water-chamber, and thence from said chamber through the air-hole in the lid $A^3$.

While I have shown the tube H as arranged to telescope over the upper end of the tube F, in the embodiments illustrated in Figs. 1 and 2, my invention is not limited to this arrangement. For example, instead of the valve tube H being entirely withdrawn from the upper end of the tube F in order to permit access of the water to the carbid, the tubes H and F may have a substantial sliding connection with each other, and the upper end of the tube F may be provided with a transverse opening or openings, as indicated at $f$ (Fig. 5), whereby the water may pass through said openings to the interior of the tube F. When the valve tube H is pushed downward, it closes these openings $f$ and thereby shuts off the water supply. When the valve tube H is lifted, it exposes the openings $f$ and the water is then supplied to the carbid.

Furthermore, the bottom of the water-chamber formed by the partition $A'$ may have a slight depression around the upper end of the water tube F to enable the valve tube H to make a tight sliding fit with the inside of the vertical walls of said depression. This construction is illustrated in Fig. 4 and has the advantage that substantially all the water in the water-chamber, except what is trapped in the depression, may escape to the carbid. The walls of this depression in effect form, in connection with the water-supply tube F, a conduit by which water is conducted from the water-chamber to the carbid-chamber.

A modified form of what is disclosed herein, together with additional features, is shown in my Patent No. 1,101,982, dated June 30, 1914.

I claim:—

1. A miner's lamp provided with a combined water-control valve and poke-rod;—said water-control valve consisting of a pipe adapted to make telescopic connection with the water supply pipe of said lamp, and said poke-rod being located longitudinally in said telescoping pipe and held in the same by means of a bend at the upper end thereof caused by the bending of said pipe.

2. A miner's lamp provided with a combined water-control valve, poke-rod and safety resistance;—said water-control valve consisting of a pipe adapted to make telescopic connection with the water supply pipe of said lamp, and having a piece of porous material set therein as a displaceable safety resistance, and said poke-rod being located longitudinally in said telescoping pipe and held in the same by means of a bend at the upper end thereof caused by the bending of said pipe.

3. In a lamp, the combination, with a water-chamber, a carbid-chamber, and a water-supply tube forming a communication between said chambers, of a valve-tube extending through the top of the lamp and having its lower end arranged to make a sliding fit water-tight with the upper end of the water-supply tube, the upper end of said valve-tube being bent and serving as a handle whereby the valve-tube may be moved into and out of connection with said water-supply tube and a raking wire held in said tube by said bend.

FREDERIC E. BALDWIN.

Witnesses:
   W. P. PREBLE,
   E. M. DOUGHTY.

Copies of this patent may be obtained for five cents each, by addressing the "Commissioner of Patents, Washington, D. C."